United States Patent
Hiruma (10) Patent No.: US 9,486,769 B2
(45) Date of Patent: *Nov. 8, 2016

(54) METHOD OF MANUFACTURING GEL PARTICLES, AND DRIVE SIGNAL GENERATION DEVICE FOR LIQUID EJECTION HEAD

(75) Inventor: Kei Hiruma, Chino (JP)

(73) Assignee: Seiko Epson Corporation, Tokyo (JP)

( * ) Notice: Subject to any disclaimer, the term of this patent is extended or adjusted under 35 U.S.C. 154(b) by 340 days.

This patent is subject to a terminal disclaimer.

(21) Appl. No.: 13/565,883

(22) Filed: Aug. 3, 2012

(65) Prior Publication Data

US 2013/0043610 A1 Feb. 21, 2013

(30) Foreign Application Priority Data

Aug. 18, 2011 (JP) .................. 2011-178789

(51) Int. Cl.
  *B01J 13/02* (2006.01)
  *B01J 13/00* (2006.01)
(52) U.S. Cl.
  CPC .................. *B01J 13/0065* (2013.01)
(58) Field of Classification Search
  CPC ........................................................ B01J 8/32
  See application file for complete search history.

(56) References Cited

U.S. PATENT DOCUMENTS

| | | | |
|---|---|---|---|
| 6,502,914 B2 * | 1/2003 | Hosono et al. | 347/11 |
| 6,705,696 B1 | 3/2004 | Okuda et al. | |
| 8,096,632 B2 | 1/2012 | Ihara | |
| 8,668,296 B2 | 3/2014 | Hiruma | |
| 2002/0167559 A1 | 11/2002 | Hosono et al. | |
| 2003/0048331 A1 | 3/2003 | Takahashi et al. | |
| 2005/0054751 A1 | 3/2005 | Namba et al. | |
| 2005/0126435 A1 | 6/2005 | Hanmura et al. | |
| 2006/0221106 A1 * | 10/2006 | Mataki | 347/10 |
| 2007/0119336 A1 * | 5/2007 | Nakahama et al. | 106/31.6 |
| 2008/0036807 A1 * | 2/2008 | Ihara | B41J 2/04581 347/11 |
| 2008/0137147 A1 | 6/2008 | Nakano et al. | |
| 2008/0180486 A1 * | 7/2008 | Ozaki et al. | 347/47 |

(Continued)

FOREIGN PATENT DOCUMENTS

| | | |
|---|---|---|
| EP | 0900657 | 3/1999 |
| EP | 1034928 | 9/2000 |
| JP | 11-198444 | 7/1999 |

(Continued)

OTHER PUBLICATIONS

JPO Machine English Translation of JP2011-167670.*

(Continued)

*Primary Examiner* — Jeffrey Washville
(74) *Attorney, Agent, or Firm* — Workman Nydegger (57) ABSTRACT

A method of manufacturing gel particles adapted to apply a voltage to a liquid ejection head to eject a liquid including a polymeric material toward an ejection target liquid to thereby manufacture the gel particles, includes: raising the voltage from a first voltage to a second voltage at a first gradient; raising the voltage from the second voltage to a third voltage at a second gradient steeper than the first gradient at which the voltage is raised from the first voltage to the second voltage, and then holding the voltage at the third voltage; dropping the voltage from the third voltage to a fourth voltage, and then holding the voltage at the fourth voltage; raising the voltage from the fourth voltage to a fifth voltage at a third gradient, wherein the third gradient is gentler than the second gradient.

8 Claims, 7 Drawing Sheets

(56) References Cited

U.S. PATENT DOCUMENTS

2010/0188451 A1* 7/2010 Ozawa .................. B41J 2/04593
                                                           347/10
2011/0205274 A1   8/2011 Hiruma

FOREIGN PATENT DOCUMENTS

| JP | 2000-218778 | 8/2000 |
| JP | 2002-337333 | 9/2000 |
| JP | 2005-170035 | 6/2005 |
| JP | 2008-037027 | 2/2008 |
| JP | 2008-162258 | 7/2008 |
| JP | 2010-173159 | 8/2010 |
| JP | 2011-167670 | 9/2011 |

OTHER PUBLICATIONS

U.S. Appl. No. 13/032,438, Apr. 12, 2013, Office Action.
U.S. Appl. No. 13/032,438, Oct. 24, 2013, Notice of Allowance.
European Search Report for Application No. 11155337.6 dated May 31, 2011.

* cited by examiner

* The symbols t1, t2, ·· indicate the durations of the respective waveform components 1, 2, ··.
* The gradient is defined as (voltage variation)/(duration) in each of the components.

METHOD OF MANUFACTURING GEL PARTICLES, AND DRIVE SIGNAL GENERATION DEVICE FOR LIQUID EJECTION HEAD

BACKGROUND

1. Technical Field

The present invention relates to a method of manufacturing gel particles and a drive signal generation device for a liquid ejection head.

2. Related Art

There is known a method of manufacturing gel particles by ejecting a liquid toward an ejection target liquid. Further, there has been considered drug delivery for making the gel particles manufactured by such a method as described above include a medicine, and then injecting the gel particles into a blood vessel, thereby making the medicine reach an affected area in the body. In view of the injection into the body, it is preferable to manufacture smaller gel particles. Therefore, it is required to make it possible to manufacture the gel particles by ejecting smaller droplets of the liquid from a liquid ejection head.

It should be noted that although the description of "gel" is used in the present specification for the sake of convenience of explanation, the invention relates to a technology of making microscopic capsules such as "microspheres," "microcapsules," or "gel beads."

JP-A-2000-218778 discloses that in order for ejecting small droplets of a liquid the variation time of a first voltage variation process for reducing the volume of a pressure generation chamber and the variation time of a second voltage variation process for increasing the volume of the pressure generation chamber in the driving waveform are set to equal to or shorter than the natural period (the natural period of an actuator) of the natural vibration of an electromechanical transducer to thereby achieve the miniaturization.

However, as described above, there has been a problem that it is difficult to eject the droplets of the liquid including a polymeric material in a miniaturized manner even if the variation time of the processes is set to be equal to or shorter than the natural period of the actuator as described above.

SUMMARY

An advantage of some aspects of the invention is to miniaturize the droplets of a liquid including a polymeric material when ejecting the liquid.

An aspect of the invention is directed to a method of driving a liquid ejection head adapted to apply a voltage to the liquid ejection head to thereby eject a liquid including a polymeric material, the method including: raising the voltage from a first voltage to a second voltage at a first gradient, raising the voltage from the second voltage to a third voltage at a second gradient steeper than the first gradient at which the voltage is raised from the first voltage to the second voltage, and then holding the voltage at the third voltage, dropping the voltage from the third voltage to a fourth voltage, and then holding the voltage at the fourth voltage, raising the voltage from the fourth voltage to a fifth voltage at a third gradient, and then holding the voltage at the fifth voltage, dropping the voltage from the fifth voltage to a sixth voltage, and then holding the voltage at the sixth voltage, and raising the voltage from the sixth voltage to a seventh voltage, wherein the third gradient at which the voltage is raised from the fourth voltage to the fifth voltage is gentler than the second gradient at which the voltage is raised from the second voltage to the third voltage.

Other aspects of the invention will be apparent from the present specification and the accompanying drawings.

BRIEF DESCRIPTION OF THE DRAWINGS

The invention will be described with reference to the accompanying drawings, wherein like numbers reference like elements.

DESCRIPTION OF EXEMPLARY EMBODIMENTS

According to the description of the present specification and the accompanying drawings, at least following items become clear.

There is provided a method of driving a liquid ejection head adapted to apply a voltage to the liquid ejection head to thereby eject a liquid including a polymeric material including: raising the voltage from a first voltage to a second voltage at a first gradient, raising the voltage from the second voltage to a third voltage at a second gradient steeper than the first gradient at which the voltage is raised from the first voltage to the second voltage, and then holding the voltage at the third voltage, dropping the voltage from the third voltage to a fourth voltage, and then holding the voltage at the fourth voltage, raising the voltage from the fourth voltage to a fifth voltage at a third gradient, and then holding the voltage at the fifth voltage, dropping the voltage from the fifth voltage to a sixth voltage, and then holding the voltage at the sixth voltage, and raising the voltage from the sixth voltage to a seventh voltage, wherein the third gradient at which the voltage is raised from the fourth voltage to the fifth voltage is gentler than the second gradient at which the voltage is raised from the second voltage to the third voltage.

According to this configuration, the droplets of the liquid to be ejected can be miniaturized when ejecting the liquid including a polymeric material.

Further, since the gradient at which the voltage is raised from the fourth voltage to the fifth voltage is gentler than the gradient at which the voltage is raised from the second voltage to the third voltage, it is possible to pull the meniscus inward (to the side of preventing the ejection) while preventing the formation of the hollow in the meniscus, which is caused when raising the voltage from the second voltage to the third voltage and the fine droplet formation caused by the formation of the hollow, and therefore, it becomes possible to cut the tail of the droplet without ejecting superfluous droplets.

In the method of driving the head described above, it is preferable that the second voltage is one of equal to and higher than 50% of the third voltage.

According to this configuration, it becomes possible to provide the hollow to the meniscus, thereby making it possible to eject further miniaturized droplets of the liquid.

Further, it is preferable that the first voltage is equal to the seventh voltage.

According to this configuration, an intermediate voltage can be used as the first voltage and the seventh voltage.

Further, it is preferable that the fourth voltage is higher than the first voltage.

According to this configuration, it is possible to push out the meniscus outward (to the side to which the droplet is ejected) to the extent that a large droplet is not ejected.

Further, it is preferable that a viscosity of the liquid including the polymeric material is in a range of 5 through 20 mPa·s.

The solution having the viscosity of 5 through 20 mPa·s is categorized as a solution with a relatively low viscosity in the solutions including polymeric material, and is high in the fluidity of the liquid itself. Therefore, since the fluidity of the solution can be controlled in accordance with the variation in the drive signal, it becomes possible to cut the tail of the droplet only with a minute variation in the drive signal to thereby eject the miniaturized droplet with accuracy.

Further, it is preferable that the liquid including the polymeric material includes sodium alginate.

According to this configuration, the gel particles including sodium alginate can be manufactured.

There is provided a drive signal generation device for a liquid ejection head adapted to generate a drive signal for applying a voltage to a liquid ejection head and making the liquid ejection head eject a liquid including a polymeric material, including a section in which a voltage to be applied to the liquid ejection head is held at a first voltage, raised from the first voltage to a second voltage at a first gradient, raised from the second voltage to a third voltage at a second gradient steeper than the first gradient at which the voltage is raised from the first voltage to the second voltage, then held at the third voltage, dropped from the third voltage to a fourth voltage, held at the fourth voltage, raised from the fourth voltage to a fifth voltage at a third gradient, then held at the fifth voltage, dropped from the fifth voltage to a sixth voltage, and then held at the sixth voltage, and raised from the sixth voltage to a seventh voltage, wherein the third gradient at which the voltage is raised from the fourth voltage to the fifth voltage is gentler than the second gradient at which the voltage is raised from the second voltage to the third voltage.

According to this configuration, the droplets of the liquid to be ejected can be miniaturized when ejecting the liquid including a polymeric material.

Embodiment

Figure 1:
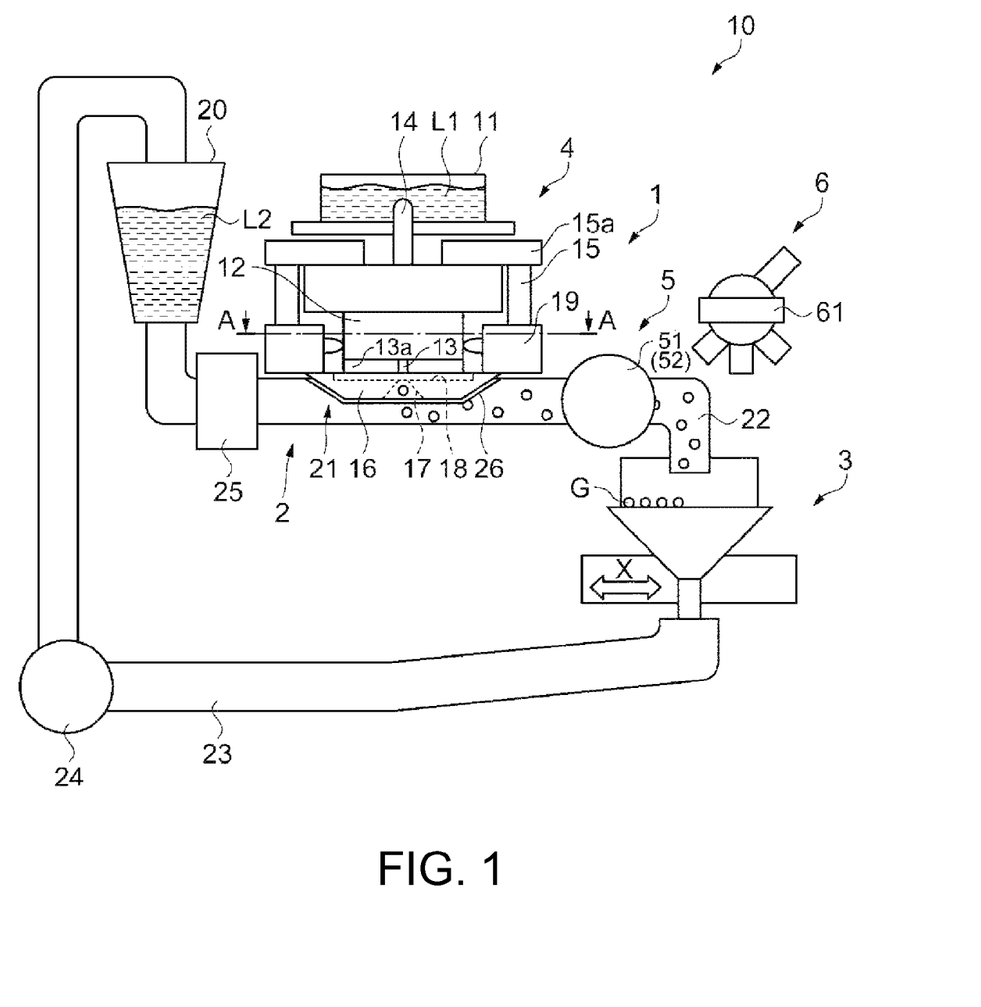
FIG. 1 is a schematic side view showing a gel manufacturing device.
Figure 2:
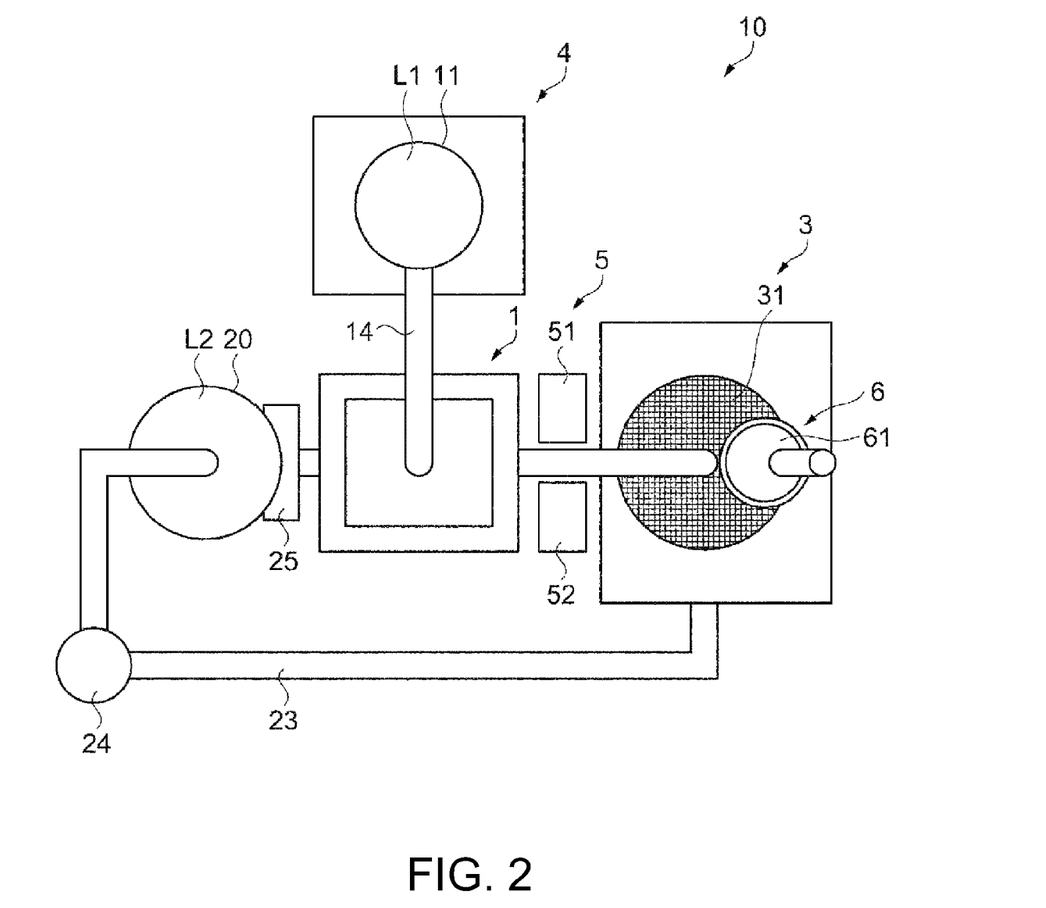
FIG. 2 is a schematic plan view showing the gel manufacturing device.

FIG. 1 is a schematic side view showing a gel manufacturing device, and FIG. 2 is a schematic plan view showing the gel manufacturing device. The gel manufacturing device 10 is provided with an ejection mechanism 1, a flow mechanism 2, a gel collection mechanism 3, an ejection measurement mechanism 4, a gel weighing mechanism 5, and an observation mechanism 6.

The gel manufacturing device 10 ejects a first solution L1 from the ejection mechanism 1 toward a second solution L2 flowing through the flow mechanism 2 to thereby obtain gel particles G generated from the first solution L1 and the second solution L2 reacting chemically with each other in a discharge section 22. In the present embodiment, sodium alginate solution is used as the first solution L1, and calcium chloride solution is used as the second solution L2. Sodium alginate and calcium chloride react chemically with each other to thereby generate sodium alginate gel.

The ejection mechanism 1 is provided with a first reservoir 11 for containing the first solution L1, an ejection head 12, a supply pipe 14 for supplying the first solution L1 from the first reservoir 11 to the ejection head 12, a gap plate 16, a reinforcing plate 19, fixing columns 15, and fixing jigs 15a.

The ejection head 12 has a nozzle plate 13a provided with a nozzle 13. The nozzle 13 has a diameter of, for example, 20 μm, and the first solution L1 is ejected from the nozzle 13 at an ejection frequency of no lower than 10 Hz. Although the condition of providing a single nozzle 13 to the ejection head 12 is shown in the drawings, this is not a limitation, but it is also possible to form two or more nozzles 13. Although a single ejection head 12 is provided to the ejection mechanism 1 according to the drawings, this is not a limitation, but a configuration of providing two or more ejection heads 12 to the ejection mechanism 1 can also be adopted.

The gap plate 16 is provided with a through hole 17 and a groove 18. The gap plate 16 is made of, for example, transparent acrylic resin. By using the transparent gap plate 16, the alignment between the nozzle 13 and the through hole 17 can easily be performed while checking it visually using a microscope or the like. The through hole 17 and the nozzle 13 are arranged so as to form a continuous hole. Thus, the configuration in which the first solution L1 to be ejected from the nozzle 13 passes through the through hole 17 is obtained. The through hole 17 is provided with a water-repellent coating such as fluorine series or silicon series. Similarly, the gap plate 16 is provided with a water-repellent coating such as fluorine series or silicon series. It is assumed that the diameter of the through hole 17 on the side facing the nozzle 13 is equivalent to or larger than the diameter of the nozzle 13. Further, it is also assumed that the diameter of the through hole 17 on the other side is equivalent to or larger than the diameter of the through hole 17 on the side facing the nozzle 13. In other words, the through hole 17 has a cylindrical shape with a constant diameter or a tapered shape with a diameter increasing in a direction from the side facing the nozzle 13 to the other side. The angle of the tapered shape can arbitrarily be determined within a range from 90 degrees to 180 degrees. Further, the flow section 21 side of the through hole 17 is worked to have a round shape.

The gap plate 16 is fixed to the reinforcing plate 19 formed to have a frame shape with an adhesive or the like. The reinforcing plate 19 reinforces the mechanical strength of the gap plate 16. The gap plate 16 and the reinforcing plate 19 are formed to have outer diameters decreasing in a direction from the reinforcing plate 19 to the gap plate 16.

The flow mechanism 2 is provided with a second reservoir 20 for containing the second solution L2, the flow section 21 and the discharge section 22 through which the second solution L2 flows, and a solution circulation section 23. The second reservoir 20 is communicated with a filter 25 and the flow section 21. The discharge section 22 is communicated with the flow section 21. The second solution L2 contained in the second reservoir 20 is filtrated by the filter 25, and then fed to the flow section 21 and the discharge section 22.

The discharge section 22 transmits the second solution L2 having flown through the flow section 21 and the gel particles G thus generated. The solution circulation section 23 is provided with, for example, a pump 24. The second solution L2 having passed through the discharge section 22 is collected by the solution circulation section 23, and then circulated by the pump 24 to the second reservoir 20.

The second reservoir 20 is made of, for example, transparent or translucent polyethylene. The flow section 21 and the discharge section 22 are made of, for example, transparent acrylic resin, and are each formed to have a tubular shape. The discharge section 22 is formed to have an L shape, and is arranged so as to prevent the second solution L2 having flown from the flow section 21 from flying in all directions from the discharge section 22.

Since negative pressure is caused inside the through hole 17 of the gap plate 16 by making the second solution L2 flow between the flow section 21 and the gap plate 16, flow of the air (gas) from the groove 18 to the through hole 17 is caused by making the most use of this phenomenon. Thus, it is possible to prevent the second solution L2 from flowing from the flow mechanism 2 into the through hole 17 of the gap plate 16. Moreover, it is possible to maintain or enhance the ejection velocity of the first solution L1 ejected from the nozzle 13 of the ejection head 12.

Further, since the flow section 21 side of the through hole 17 is worked to have a round shape in the ejection mechanism 1, it is prevented that the second solution L2 flows from the through hole 17 of the gap plate 16 into the nozzle 13 of the ejection head 12, and the nozzle 13 is prevented from being choked with the second solution L2.

The solution circulation section 23 collects the second solution L2 having flown through the flow section 21, the discharge section 22, and a gel collection mechanism 3 described later, and circulates the second solution L2 to the second reservoir 20.

The gel collection mechanism 3 collects the gel particles G generated by ejecting the first solution L1 to the second solution L2, which has been made to flow.

The ejection measurement mechanism 4 measures the weight of the first reservoir 11 of the ejection mechanism 1. By measuring the weight of the first reservoir 11 for containing the first solution L1, the weight of the first solution L1 ejected from the nozzle 13 is measured using the difference in weight between before and after the ejection.

The gel weighing mechanism 5 is provided with a laser source 51 and a photoelectrical detector 52. The projection light projected from the laser source 51 is applied to the flow section 21 through which the second solution L2 and the gel particles G flow. Then, in the flow section 21, by receiving the reflected light, which is obtained by reflecting the projection light, by the photoelectrical detector 52, the number, the shape, and the size of the gel particles G thus generated are measured.

The observation mechanism 6 observes or measures the condition, such as the shape or the size, of the gel particles G collected by the gel collection mechanism 3. The observation mechanism 6 is provided with a camera 61. By shooting the gel particles G captured by a collection net 31 using the camera 61, the condition of the gel particles G thus generated, such as the shape or the size, is observed or measured.

Figure 3:
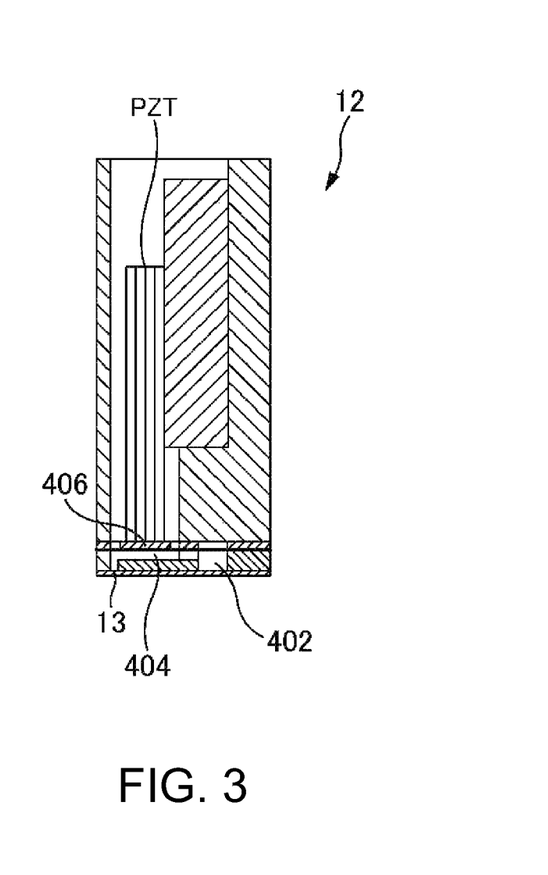
FIG. 3 is a diagram for explaining a structure of an ejection head 12.

FIG. 3 is a diagram for explaining the structure of the ejection head 12. The drawing shows a nozzle 13, a piezoelectric element PZT, a liquid supply channel 402, a nozzle communication channel 404, and an elastic plate 406.

The liquid supply channel 402 is supplied with a high viscosity liquid from the first reservoir 11. Then, such a liquid or the like is supplied to the nozzle communication channel 404. A drive signal described later is applied to the piezoelectric element PZT. When the drive signal is applied, the piezoelectric element PZT expands or contracts in accordance with the drive signal to thereby vibrate the elastic plate 406. Thus, the liquid is moved so as to correspond to the amplitude of the drive signal.

The movement of the liquid described above will specifically be explained. The piezoelectric element PZT of the present embodiment has a characteristic of contracting in a vertical direction of FIG. 3 in response to application of a voltage. When a higher voltage is applied as a drive signal instead of a certain voltage, the piezoelectric element PZT contracts in the vertical direction of FIG. 3 to thereby deform the elastic plate 406 in a direction of increasing the capacity of the nozzle communication channel 404. On this occasion, the liquid surface (the meniscus described later) in the nozzle 13 moves inward (upward in FIG. 3) in the nozzle 13. To the contrary, when a lower voltage is applied instead of a certain voltage, the piezoelectric element PZT expands in the vertical direction of FIG. 3 to thereby deform the elastic plate 406 in a direction of reducing the capacity of the nozzle communication channel 404. On this occasion, the liquid surface in the nozzle 13 moves outward (downward in FIG. 3) in the nozzle 13.

Figure 4:
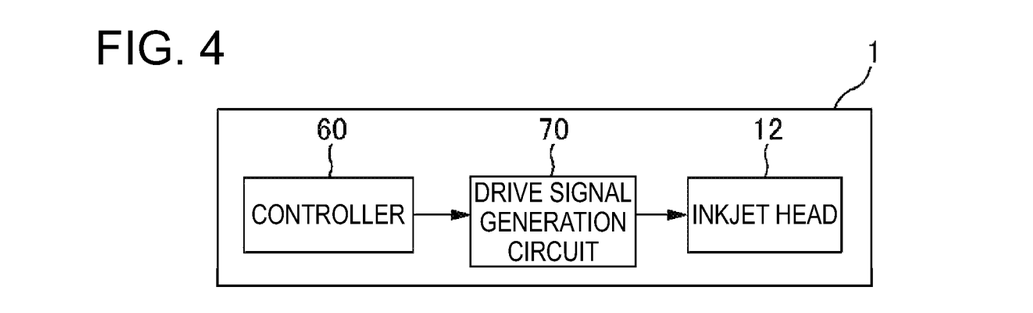
FIG. 4 is a block diagram of an ejection mechanism in an embodiment of the invention.

FIG. 4 is a block diagram of the ejection mechanism 1 according to the present embodiment of the invention. The ejection mechanism 1 is provided with a controller 60 for controlling the ejection mechanism 1 and the gel manufacturing device 10, a drive signal generation circuit 70 for generating the drive signal, and the ejection head 12. The controller 60 transmits waveform data of the drive signal to be formed to the drive signal generation circuit 70. The drive signal generation circuit 70 generates the drive signal based on the waveform data thus transmitted. The drive signal thus generated is applied to the piezoelectric element PZT of the ejection head 12, and thus the ejection head 12 ejects a droplet.

Figure 5:
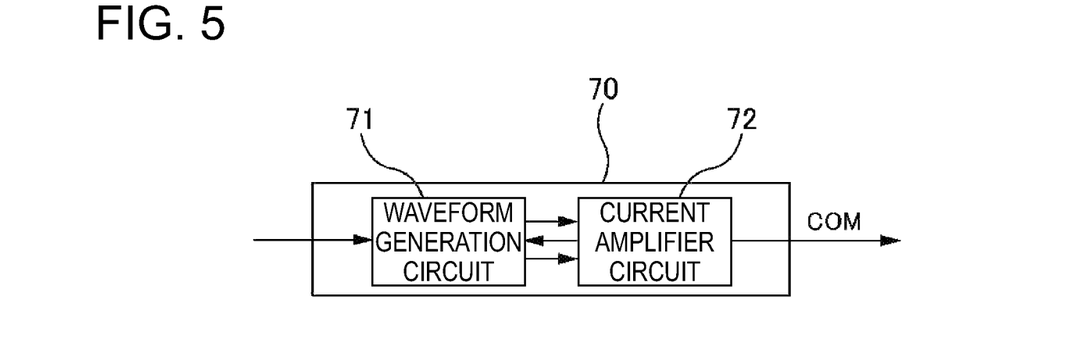
FIG. 5 is a block diagram for explaining a configuration of a drive signal generation circuit.

FIG. 5 is a block diagram for explaining a configuration of the drive signal generation circuit 70. The drive signal generation circuit 70 of the present embodiment has a waveform generation circuit 71 and a current amplifier circuit 72.

Figure 6:
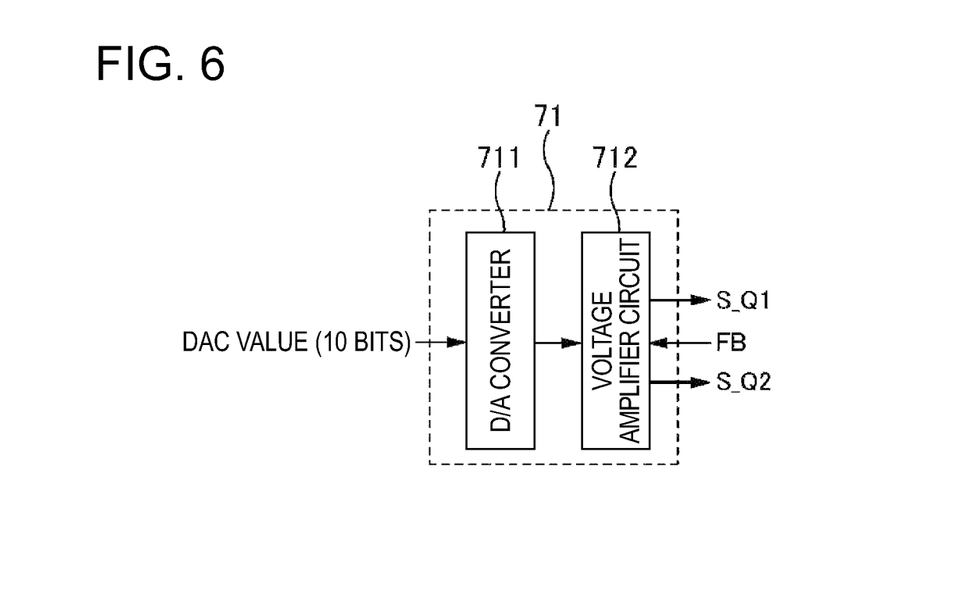
FIG. 6 is a block diagram for explaining a configuration of a waveform generation circuit.

FIG. 6 is a block diagram for explaining a configuration of the waveform generation circuit 71. The waveform generation circuit 71 has a D/A converter 711 and a voltage amplifier circuit 712. The D/A converter 711 is an electrical circuit for outputting a voltage signal corresponding to a DAC value. The DAC value is information for indicating the voltage (hereinafter also referred to as an output voltage) to be output from the voltage amplifier circuit 712, and is transmitted from the controller 60 based on the waveform data stored therein.

The voltage amplifier circuit 712 amplifies the output voltage from the D/A converter 711 up to the voltage appropriate to the operation of the piezoelectric element PZT. The voltage amplifier circuit 712 of the present embodiment amplifies the output voltage from the D/A converter 711 up to maximum of 40-odd volts. Then, the output voltage thus amplified is output to the current amplifier circuit 72 as a control signal S_Q1 and a control signal S_Q2.

Figure 7:
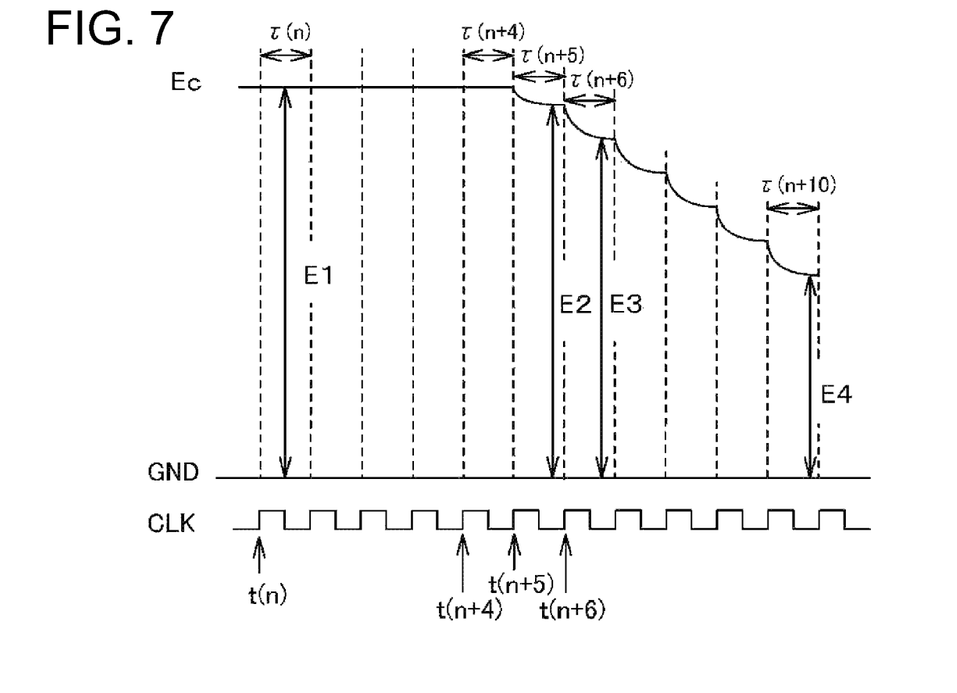
FIG. 7 is a diagram for explaining an operation of dropping an output voltage of a current amplifier circuit from a voltage E1 to a voltage E4.

FIG. 7 is a diagram for explaining an operation of dropping the output voltage of the current amplifier circuit 72 from a voltage E1 to a voltage E4.

When generating the drive signal COM, the controller 60 outputs the DAC value every predetermined updating period τ sequentially to the D/A converter 711. In the example shown in FIG. 7, the DAC value corresponding to the voltage E1 is output at the timing t(n) defined by a clock CLK. Thus, the voltage amplifier circuit 712 outputs the voltage E1 in the period τ(n). Then, up to the updating period τ(n+4), the DAC value corresponding to the voltage E1 is sequentially input to the D/A converter 711 from the controller 60, and the voltage amplifier circuit 712 continuously outputs the voltage E1. Further, at the timing t(n+5), the DAC value corresponding to the voltage E2 is input to the D/A converter 711 from the controller 60. Thus, the output of the voltage amplifier circuit 712 is dropped from the voltage E1 to the voltage E2 in the period τ(n+5). Similarly, at the timing t(n+6), the DAC value corresponding to the voltage E3 is input to the D/A converter 711 from the controller 60, thus the output of the voltage amplifier circuit 712 is dropped from the voltage E2 to the voltage E3. Since the DAC values are sequentially input to the D/A converter 711 in a similar manner as described above, the voltage output from the voltage amplifier circuit 712 is dropped gradually. Then, the output of the voltage amplifier circuit 712 is dropped to the voltage E4 in the period τ(n+10). In such a manner as described above, the drive signal is output from the waveform generation circuit 71.

Figure 8:
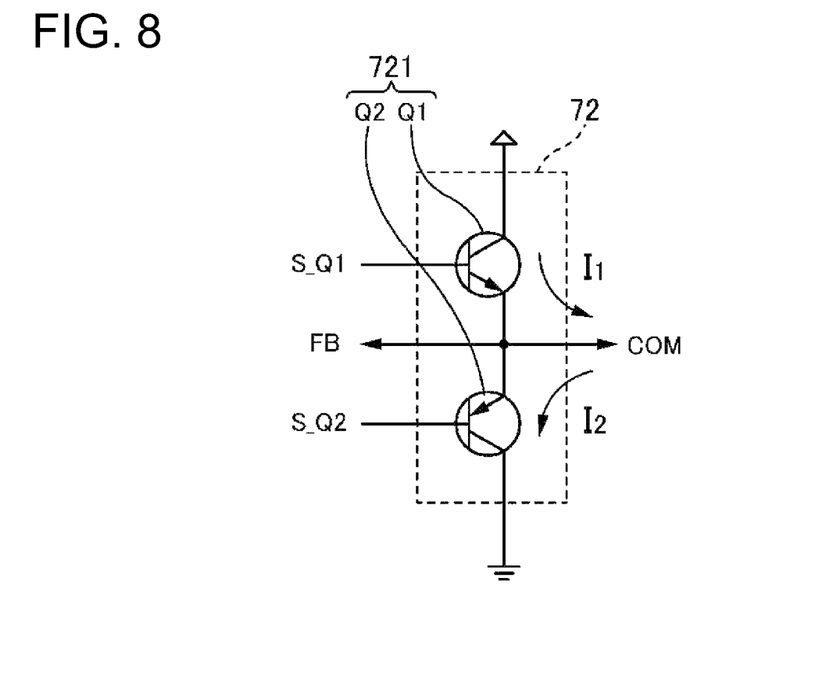
FIG. 8 is a diagram for explaining a configuration of the current amplifier circuit.

FIG. 8 is a diagram for explaining a configuration of the current amplifier circuit 72. The current amplifier circuit 72 has a pair of transistors 721 for power-amplifying the drive signal COM. The pair of transistors 721 has an NPN transistor Q1 and a PNP transistor Q2 having the respective emitter terminals connected to each other. The NPN transistor Q1 is a transistor acting when the voltage of the drive signal COM rises. The NPN transistor Q1 has a collector connected to the power supply and an emitter connected to an output signal line of the drive signal COM. The PNP transistor Q2 is a transistor acting when the voltage drops. The PNP transistor Q2 has a collector connected to the ground (earth) and an emitter connected to an output signal line of the drive signal COM. It should be noted that the voltage (the voltage of the drive signal COM) of a node where the respective emitters of the NPN transistor Q1 and the PNP transistor Q2 are connected to each other is fed back to the voltage amplifier circuit 712 as indicated by the reference symbol FB.

The operation of the current amplifier circuit 72 is controlled by the output voltage from the waveform generation circuit 71. For example, if the output voltage is in the rising state, the NPN transistor Q1 is set to the ON state by the control signal S_Q1. In conjunction therewith, the voltage of the drive signal COM also rises. In contrast, if the output voltage is in the falling state, the PNP transistor Q2 is set to the ON state by the control signal S_Q2. In conjunction therewith, the voltage of the drive signal COM also drops. It should be noted that in the case in which the output voltage is constant, both of the NPN transistor Q1 and the PNP transistor Q2 become in the OFF state. As a result, the drive signal COM becomes a constant voltage.

According to the operation described above, the drive signal having a desired shape can be generated.

Figure 9:
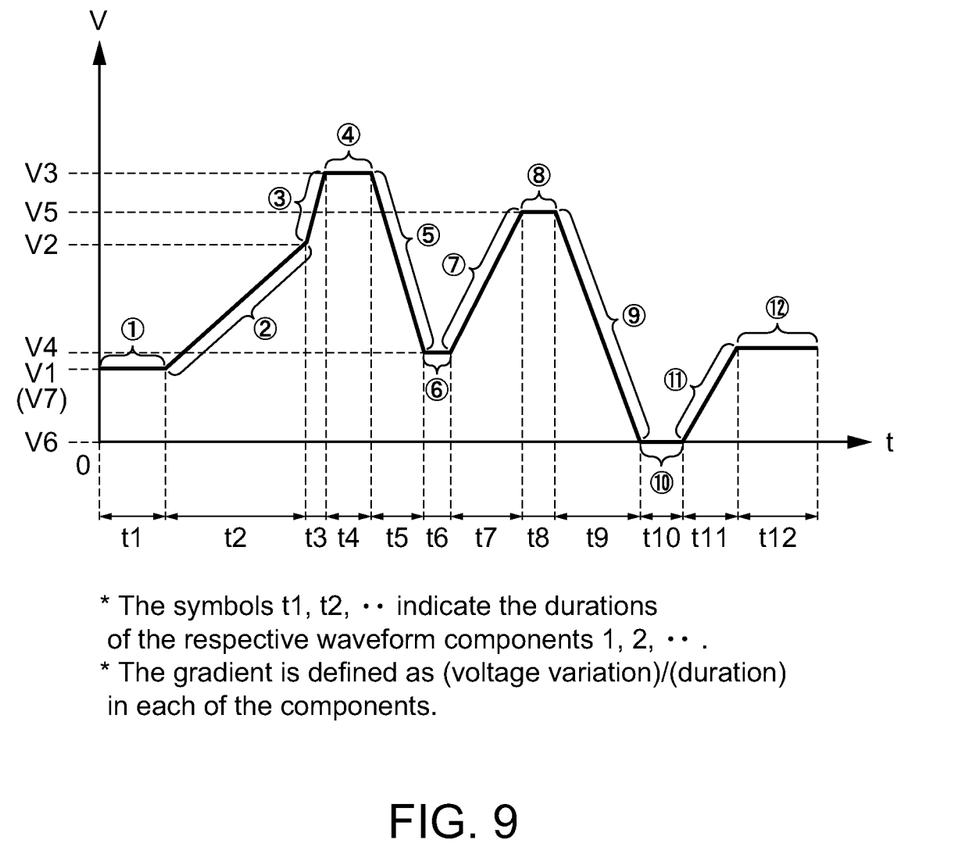
FIG. 9 is an explanatory diagram of a drive signal in the present embodiment.
Figure 10:
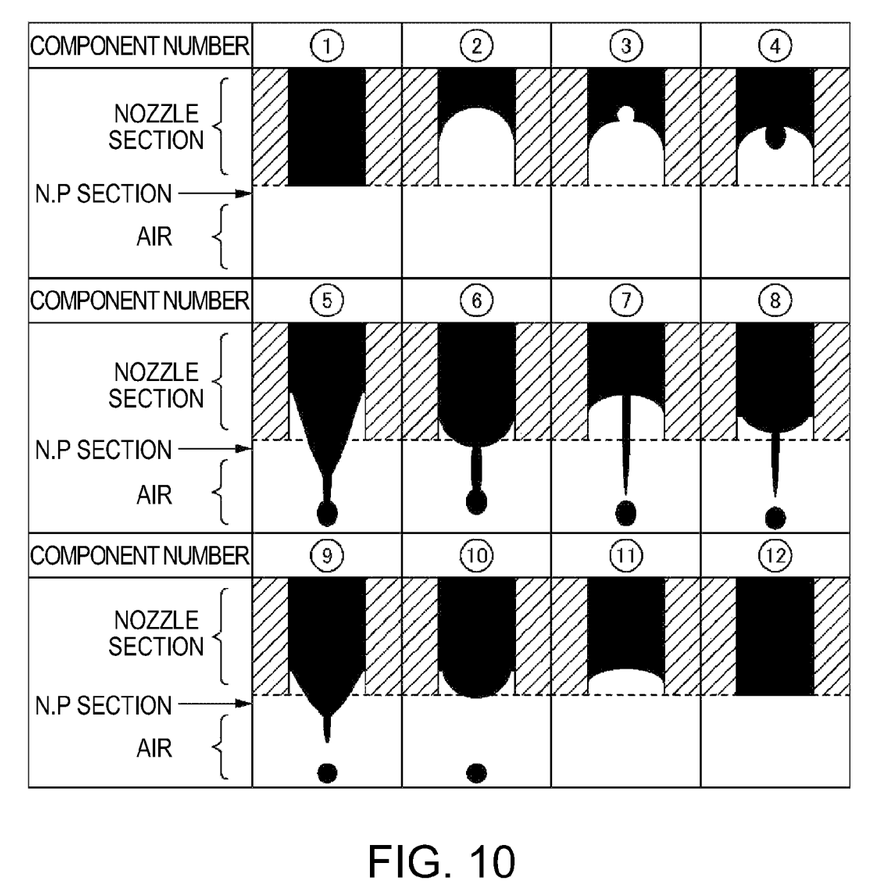
FIG. 10 is a diagram for explaining a movement of a meniscus in the present embodiment.

FIG. 9 is an explanatory diagram of the drive signal in the present embodiment, and shows the variation in the voltage of the drive signal and the duration of each of the drive signal components. FIG. 10 is a diagram for explaining the movement of the meniscus in the present embodiment. Here, the "meniscus" is a liquid surface in the nozzle. The both drawings show component numbers each surrounded by a circle. Further, FIG. 9 shows the voltages corresponding to the component numbers and the durations corresponding to the component numbers, and FIG. 10 shows conditions of the nozzle section corresponding to the component numbers. In the drawing, the liquid parts are filled with a black color. It should be noted that the "N.P section" in the drawing denotes a nozzle plate section. Thus, it is arranged that the conditions of the meniscus corresponding to the voltage variation can be recognized.

In the component number 1, the voltage is held at an intermediate voltage of V1 (corresponding to a first voltage). The intermediate voltage denotes a constant voltage to be applied to the piezoelectric element PZT in the case of providing no particular change to the meniscus. On this occasion, the meniscus does not change, and therefore, forms a plane roughly coplanar with the nozzle plate.

In the component number 2, the voltage is raised from the intermediate voltage V1 to a voltage V2 (corresponding to a second voltage). Since the voltage applied to the piezoelectric element PZT rises, the meniscus is pulled inward into the ejection head. Since the voltage variation is relatively gentle, the meniscus has a shape of a gentle arc.

In the component number 3, the voltage is raised from the voltage V2 to a voltage V3 (corresponding to a third voltage). In the component number 3, the uprise of the voltage is steeper than in the case of the component number 2. In other words, the rising rate of the voltage in the component number 3 is higher than the rising rate of the voltage in the case of the component number 2. Since the meniscus is pulled in more rapidly toward the head by raising the voltage steeper as described above, a small hollow shown in the drawing is formed at the center portion of the meniscus. It should be noted that the voltage V2 is preferably equal to or higher than 50% of the voltage V3.

In the component number 4, the voltage is held at the voltage V3. Since there exists the period during which the voltage is held at the voltage V3, the balance of the surface tension of the small hollow formed in the component number 3 is broken down, and the hollow moves downward in the drawing so as to be restored. Due to the restoring force described above, a droplet expands downward to form a fine droplet.

In the component number 5, the voltage is dropped from the voltage V3 to a voltage V4 (corresponding to a fourth voltage). On this occasion, the voltage V4 is set to be lower than the voltage V2. Although it is conceivable that the fine droplet is ejected from the nozzle even in the state of the component number 4 described above, in order for promoting the ejection of the droplet, the voltage is dropped in the component number 5. Due to the drop of the voltage, the whole liquid is biased to be pushed out of the nozzle. It should be noted that the voltage V4 is preferably higher than the voltage V1 described above. This is because in the case of setting the voltage V4 to be lower than the voltage V1, the voltage variation becomes greater than the voltage variation (from the voltage V1 to the voltage V3) necessary to form and eject the droplet, and there is a possibility that a part of the liquid existing in the nozzle is ejected in addition to the promotion of the ejection of the droplet to thereby make the droplet larger than the droplet desired to be ejected. Therefore, by setting the voltage V4 to be higher than the voltage V1, it is possible to prevent the whole liquid existing in the nozzle from being ejected.

In the component number 6, the voltage is held at the voltage V4. Here, holding of the voltage at the constant voltage V4 functions as a buffer prior to applying the voltage variation in the opposite direction in the subsequent component.

In the component number 7, the voltage is raised from the voltage V4 to a voltage V5 (corresponding to a fifth voltage). It should be noted that the gradient at which the voltage is raised from the voltage V4 to the voltage V5 is gentler than the gradient at which the voltage is raised from the voltage V2 to the voltage V3. In other words, the variation rate of the voltage from the voltage V4 to the voltage V5 is lower than the variation rate in the case of raising the voltage from the voltage V2 to the voltage V3. Since it is possible to pull the meniscus inward (in the direction of preventing the ejection) while preventing the formation of the fine droplet, which has been caused by forming the hollow in the meniscus when raising the voltage from the second voltage to the third voltage, it becomes possible to cut the tail of the droplet including the polymeric material.

In the component number 8, the voltage is held at the voltage V5. Thus, the motion of the meniscus is settled.

Here, although the motion of the meniscus is settled, it can be observed that the tail is generated between the fine droplet and the meniscus.

In the component number 9, the voltage is dropped from the voltage V5 to a voltage V6 (0V, corresponding to a sixth voltage). By thus dropping the voltage as described above, the meniscus is projected outward (downward in FIG. 3 or 10) from the nozzle plate to thereby collect the tail observed in the component number 8. It should be noted that the gradient at which the voltage is dropped from the voltage V5 to the voltage V6 is gentler than the gradient at which the voltage is dropped from the voltage V3 to the voltage V4. In other words, the variation rate of the voltage from the voltage V5 to the voltage V6 is lower than the variation rate in the case of dropping the voltage from the voltage V3 to the voltage V4.

In the component number 10, the voltage is held at the voltage V6. Thus, the motion of the meniscus is settled.

In the component number 11, the voltage is raised from the voltage V6 to an intermediate voltage V7 (corresponding to a seventh voltage). Then, in the component number 12, the state of the intermediate voltage V7 is held to thereby prepare for the subsequent droplet ejection.

By adopting the process described above, the weltering of the meniscus can be suppressed, and at the same time, it becomes possible to form the meniscus preparing for the subsequent fine droplet formation. In particular, according to the present embodiment, it is possible to eject a high viscosity liquid having viscosity of 5 through 20 mPa·s. According to the present embodiment, it is possible to eject the liquid with the viscosity of 5 through 20 mPa·s to thereby manufacture the fine gel particles. It should be noted that the viscosity of sodium alginate to be ejected in the present embodiment is in a range of 5 through 20 mPa·s. Further, the surface tension of sodium alginate is about 70 mN/m.

The solution having the viscosity of 5 through 20 mPa·s is categorized as a solution with a low viscosity in the solutions including polymeric material, and is high in the fluidity of the liquid itself. Therefore, since the fluidity of the solution can be controlled in accordance with the variation in the drive signal, it becomes possible to cut the tail of the droplet with a minute variation in the drive signal to thereby eject the miniaturized droplet. It should be noted that although a solution with a viscosity lower than 5 mPa·s or higher than 20 mPa·s can also be applied, in the case in which the droplet diameter to be ejected is microscopic, and the solution with the viscosity of 5 through 20 mPa·s is ejected to manufacture the gel particles, the advantage described above can be obtained, and therefore, the drive method according to the present embodiment is superior.

It should be noted that although it is assumed in the present embodiment that sodium alginate is ejected, the liquid is not limited thereto, but a liquid including a polymeric material and having high viscosity can be ejected. Here, the polymeric material denotes those having 1,000 or more atoms, and a molecular weight of greater than ten thousand.

Further, although in the present embodiment the piezoelectric element contracting in the vertical direction in FIG. 3 in response to application of the voltage is used, it is also possible to use a piezoelectric element expanding in the vertical direction in FIG. 3 in response to application of the voltage. The drive signal waveform in this case becomes the signal having a magnitude correlation of the voltage value opposite to that of the drive signal shown in the present embodiment.

Inside the gel particles manufactured in the present embodiment, a desired material can be encapsulated. As the desired material to be encapsulated inside the gel particles, various types of cells and various types of medical substances can be cited as an example, but the desired material is not limited thereto. More specifically, as such cells, vessel endothelial cells, fibroblast cells, smooth muscle cells, red blood cells, white blood cells, blood platelets, cancer cells, and bacteria (single cells) such as bacteria coliform and lactic acid bacteria can be cited as an example, and the gel particles encapsulating these cells can be used as protection from various types of barrier stimulus of the cells such as desiccation, carriers of cells and bacteria, therapeutic equipment such as cell transportation gels, and diagnostic instruments such as biochips. Further, as the medical substances encapsulated in the gel particles, antibiotics, antifungals, vessel endothelial cell growth factors, basic fibroblast growth factor, hepatocellular growth factors, various types of vasoactive materials, antiallergic agents, antihistamine agents, hormonal agents such as insulin, protein substances, enzymes, nucleic acids, sugar groups, amino acids, emulsified fats, moisturizing agents, perfume materials, and dyes can be cited for example, and the gel particles encapsulating such medical substances can be used as a drug delivery system (DDS) for such medical substances. It should be noted that by encapsulating the medical substances in the gel particles, there can be obtained various advantages such as keeping the duration of activity longer, controlling the duration of activity, buffering impacts of the environment to the medical substances, making it possible to mix a number of medical substances without reacting with each other compared to the case of directly administering the medical substances. As microparticles with smaller sizes, for example, nanoparticles of metal, inorganic materials, or organic materials can also be included. Since pigments, fluorescent particles, liposomes, nanomicelles, or the like are themselves provided with a particular function, microgel beads including them can be used as the DDS with a further complicated release control function. Further, by encapsulating catalysts or enzymes in the gel particles, micro-sized reaction fields of the catalysts or the enzymes are provided. Application in microcolumn in reaction fields in microchannel becomes possible.

Although the explanation is presented here assuming that the sodium alginate solution is used as the first solution L1 and the calcium chloride solution is used as the second solution, the solutions are not limited thereto. These materials are cited as an example of a combination of an alginate solution and an alkaline earth metal salt solution, and barium chloride can also be cited as an example of the alkaline earth metal salt.

Further, for example, as the combination of the first solution L1 and the second solution L2, there can be cited combinations of (1) a boric acid solution and a polyvinyl alcohol solution, (2) a peptide hydrogel-forming peptide solution and a sodium chloride solution, (3) a thermogelling thermoreversible hydrogel-forming hydrophilic polymer solution and warm water. Further, combinations of (4) a water solution including any two components of a thrombin solution, a fibrinogen solution, and a calcium salt solution and a water solution including the rest of the components can also be adopted.

As peptide hydrogel-forming peptide of the combination (2) described above, there can be cited the peptide having natural amino acid, acidic amino acid, and/or basic amino acid arranged alternately, and the number of amino acids of 12 through 20, preferably about 16.

The thermogelling thermoreversible hydrogel-forming hydrophilic polymer of the combination (3) described above is block copolymer composed of a temperature-sensitive polymer segment such as poly(N-isopropylacrylamide) or polypropylene oxide, and a hydrophilic polymer segment such as polyethylene oxide, and is a material commercially available from Mebiol Inc. under a trade name of "Mebiol Gel," for example. Since Mebiol Gel (the trade name) is a sol at a low temperature, and is gelled at 37° C. or higher, by using Mebiol Gel (the trade mane) solution at 36° C. or lower as the first solution L1 and warm water at 37° C. or higher as the second solution L2, the first solution emitted into the second solution L2 is gelled in the second solution L2. It should be noted that the Mebiol Gel (the trade name) solution has a relatively high viscosity, but can appropriately be ejected in the case of using the drive signal according to the present embodiment.

Other Embodiments

Although in the embodiment described above the gel manufacturing device 10 is explained as the liquid ejection device, the liquid ejection device is not limited thereto, but can also be embodied as a liquid discharge device for ejecting or discharging other fluids (a liquid, a liquid-like body having particles of a functional material dispersed, and a flowable body such as a gel). Similar technologies to the embodiment described above can be applied to various kinds of devices using the inkjet technology such as a color filter manufacturing device, a dyeing device, a fine processing device, a semiconductor manufacturing device, a surface processing device, a three-dimensional modeling device, a liquid vaporizing device, an organic EL manufacturing device (in particular, a polymer EL manufacturing device), a display manufacturing device, a deposition device, and a DNA chip manufacturing device. Further, methods therefor and manufacturing methods can also be included in a range of applications.

The embodiments described above are for making understanding of the invention easier, but not for providing limited interpretations of the invention. The invention can obviously be modified or improved within the scope and spirit thereof, and include equivalents thereof.

This application claims priority to Japanese Patent Application No. 2011-178789, filed on Aug. 18, 2011, the entirety of which is hereby incorporated by reference.

What is claimed is:

1. A method of manufacturing gel particles adapted to apply a voltage to a liquid ejection head to eject a liquid including a polymeric material toward an ejection target liquid to thereby manufacture the gel particles, the method comprising:
    raising the voltage from a first voltage to a second voltage at a first gradient, wherein the first voltage is an intermediate voltage that is between a voltage maximum and a voltage minimum;
    raising the voltage from the second voltage to a third voltage, without holding the voltage at the second voltage, at a second gradient steeper than the first gradient at which the voltage is raised from the first voltage to the second voltage, and then holding the voltage at the third voltage, wherein the third voltage is the voltage maximum;
    dropping the voltage from the third voltage to a fourth voltage, and then holding the voltage at the fourth voltage;
    raising the voltage from the fourth voltage to a fifth voltage at a third gradient, and then holding the voltage at the fifth voltage;
    dropping the voltage from the fifth voltage to a sixth voltage, and then holding the voltage at the sixth voltage, wherein the sixth voltage is the voltage minimum; and
    raising the voltage from the sixth voltage to a seventh voltage,
    wherein the third gradient at which the voltage is raised from the fourth voltage to the fifth voltage is gentler than the second gradient at which the voltage is raised from the second voltage to the third voltage,
    wherein the second voltage is one of equal to or higher than 50% of the third voltage.

2. The method of manufacturing gel particles according to claim 1, wherein the first voltage is equal to the seventh voltage.

3. The method of manufacturing gel particles according to claim 1, wherein the fourth voltage is higher than the first voltage.

4. The method of manufacturing gel particles according to claim 1, wherein the liquid including the polymeric material has a viscosity no lower than 5 mPa·s and no higher than 20 mPa·s.

5. The method of manufacturing gel particles according to claim 1, wherein the liquid including the polymeric material includes sodium alginate.

6. The method of manufacturing gel particles according to claim 1, further comprising:
    encapsulating a medical substance.

7. A drive signal generation device for a liquid ejection head adapted to generate a drive signal for applying a voltage to a liquid ejection head and making the liquid ejection head eject a liquid including a polymeric material, comprising a section in which a voltage to be applied to the liquid ejection head is
    held at a first voltage, wherein the first voltage is an intermediate voltage that is between a voltage maximum and a voltage minimum,
    raised from the first voltage to a second voltage at a first gradient,
    raised from the second voltage to a third voltage, without holding the voltage at the second voltage, at a second gradient steeper than the first gradient at which the voltage is raised from the first voltage to the second voltage, then held at the third voltage, wherein the third voltage is the voltage maximum, dropped from the third voltage to a fourth voltage, then held at the fourth voltage, raised from the fourth voltage to a fifth voltage at a third gradient, then held at the fifth voltage, dropped from the fifth voltage to a sixth voltage, and then held at the sixth voltage, wherein the sixth voltage is the voltage minimum, and raised from the sixth voltage to a seventh voltage, wherein the third gradient at which the voltage is raised from the fourth voltage to the fifth voltage is gentler than the second gradient at which the voltage is raised from the second voltage to the third voltage, wherein the second voltage is one of equal to or higher than 50% of the third voltage.

8. A method of manufacturing gel particles adapted to apply a voltage to a liquid ejection head to eject a liquid including a polymeric material toward an ejection target liquid to thereby manufacture the gel particles, the method comprising:

raising the voltage from a first voltage to a second voltage at a first gradient, wherein the first voltage is an intermediate voltage that is between a voltage maximum and a voltage minimum;

raising the voltage from the second voltage to a third voltage, without holding the voltage at the second voltage, at a second gradient steeper than the first gradient at which the voltage is raised from the first voltage to the second voltage, and then holding the voltage at the third voltage, wherein the third voltage is the voltage maximum, wherein the second voltage is one of equal to or higher than 50% of the third voltage.

* * * * *